Nov. 14, 1933.    C. DREXLER    1,935,147

METHOD OF MAKING CLUTCH SPRINGS

Original Filed Dec. 3, 1932

Inventor:
Charles Drexler,
By: Arthur W. Wilson
Atty.

Patented Nov. 14, 1933

1,935,147

UNITED STATES PATENT OFFICE 1,935,147

METHOD OF MAKING CLUTCH SPRINGS

Charles Drexler, Indianapolis, Ind., assignor to L. G. S. Devices Corporation, Indianapolis, Ind., a corporation of Indiana Original application December 3, 1932, Serial No. 645,527. Divided and this application June 23, 1933. Serial No. 677,207

11 Claims. (Cl. 29—173)

This invention relates to improvements in method of making clutch springs and it consists of the matters hereinafter described and more particularly pointed out in the appended claims.

This application is a divisional application and the subject matter thereof was first embodied in my copending application, Serial No. 645,527, filed December 3, 1932.

The springs with which the present invention is more particularly concerned are helical and are adapted for use in connection with coacting clutch member which upon a relative rotation in one direction so act upon said spring as to cause it to change its diameter and clutch said members together.

To make such springs more sensitive in their action, certain expedients have been tried. In one instance, longitudinal grooves have been provided in the coils in one end of the spring, with the grooves being the deepest at the extremity of said end. In this manner, the convolution at said extremity was the most flexible and the succeeding coils or convolutions decreased in flexibility toward the other end of the grooves which was located at a point about midway between the ends of the spring.

These grooves were formed in any suitable manner, as for example, with the aid of an abrasive wheel. Such springs were heat treated for tempering and hardening and finally turned or ground to make them as cylindrical as possible and provide the gripping surface therefor. Usually these grooves are provided in the external surface of the spring because of the ease with which they could be there formed and in other instances the interior surface of the spring formed the gripping surface. Such clutch springs were differentiated by the terms "outside grip" and "inside grip" respectively. In either instance, it was of course desired that the gripping surface be as truly cylindrical as possible.

The various operations on the spring such as winding, bending the same to form the anchoring toe or tang and the grooving which usually preceeded the grinding operations, set up strains in the spring. These strains are quite apt to manifest themselves in many ways and produce distortions and crystallizations which at times cause the spring to break in use. In accordance with one step of my improved method these strains are relieved and the spring stock is toughened so as to avoid breakage normally due thereto.

As a clutch spring in a clutch of the kind so using the same, depends on friction for its holding power, its gripping surface, whether on the inside or outside of the spring, must be as cylindrical as possible and as the spring is inherently flexible, it is apparent that it is quite difficult to so turn or grind said surface accurately to the desired diameter.

Grinding such surfaces is much superior to turning but it has been found that even with the best grinding equipment available, it is very nearly impossible to grind a true cylindrical surface on a spring having the straight continuous grooves before mentioned. I have discovered that the reason for this inability to produce a true cylindrical surface on such a grooved spring is that the grinding wheel tends to drop into said grooves. This sets up a chatter or vibration in the spring so that the finished spring has a surface contour resembling a many sided polygon with rounded corners and therefore obviously not best suited for clutching purposes.

An object of the invention is to provide an improved method of making such a spring, whereby greater accuracy in grinding is possible, and whereby a more nearly true cylindrical gripping surface results.

Another object of the invention is to provide an improved method of making a clutch spring wherein the grooves in certain coils of a group of coils are circumferentially offset with respect to those in other coils of said group so that the length of any particular groove presented to the grinding wheel in the grinding operation is so short that the wheel cannot enter or drop into the same, and so that no vibration is set up in the spring as will interfere with its being readily ground to a highly accurate cylindrical surface.

The above mentioned objects of the invention, as well as others, together with the many advantages thereof, will more fully appear as I proceed with my specification.

Figure 3:
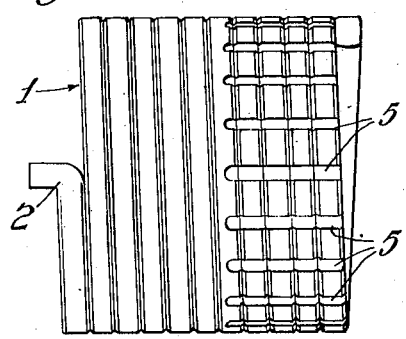
Fig. 3 is a view in side elevation of the spring after having been longitudinally grooved as shown in Fig. 2.
Figure 4:
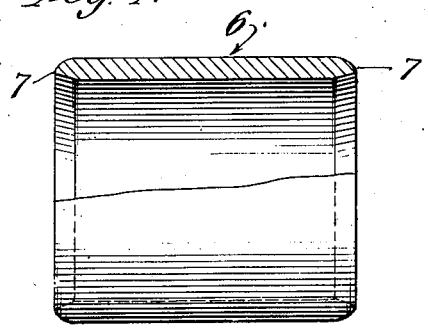
Figure 5:
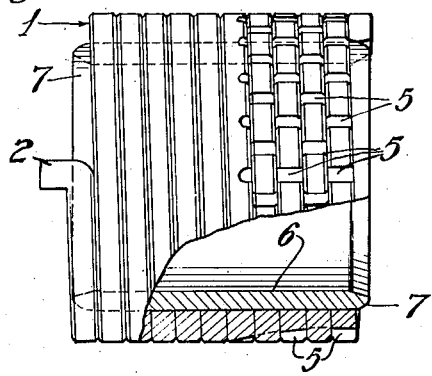
Figure 6:
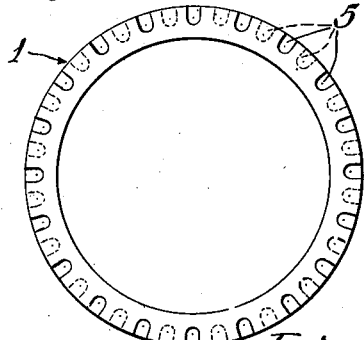

Fig. 4 is a view partly in side elevation and partly in section of a tubular arbor, which is forced or pressed into the spring blank shown in Fig. 3 from its grooved end to enlarge the diameter of the spring and cause staggering or circumferential offsetting of parts of the grooves in certain of the coils or convolutions and at the same time provide a support for the spring blank when subjected to a normalizing treatment to impart a set to said blank;

Fig. 5 is a view partly in side elevation and partly in section of the thus far completed spring after the arbor shown in Fig. 4 has been pressed thereinto to expand the spring and cause the staggering or circumferential offsetting of the grooves; and Fig. 6 is a view in end elevation of the spring shown in Fig. 5 after the arbor of Fig. 4 has been removed therefrom so that the spring is ready for its grinding operation.

Figure 1:
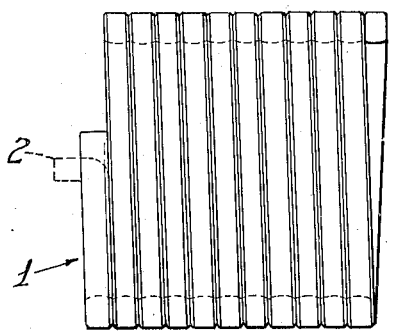
Fig. 1 is a view in side elevation of a spring after it has been wound to form what may be called a "spring blank" ready for other operations thereon in accordance with my improved method of making clutch springs.
Figure 2:
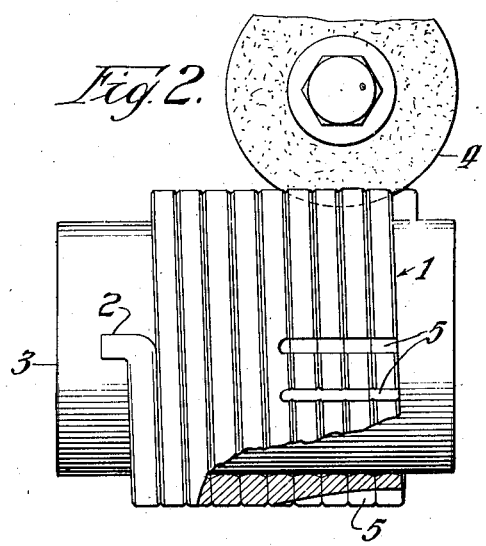
Fig. 2 is a view in side elevation of the spring blank and illustrates one manner of providing certain arcuately spaced, gradient grooves in a group of the coils at one end of the spring, as by grinding and also shows the initial disposition of said grooves as continuous ones in said spring blank.

Referring now in detail to that embodiment of the invention, illustrated in the drawing:

I first take a suitable length of spring stock and following usual spring practice, wind the same into the spring form or blank 1 shown in Fig. 1. Preferably such stock is first hardened and tempered before such winding. If the spring is to have an anchoring toe or tang 2, the same may at this time be conveniently formed by bending the end of one of the endmost coils or convolutions so as to extend axially as best shown in Fig. 1.

In a finished spring of a 2½" size, the formed blank therefore, will have an inside diameter of approximately 1.955", these dimensions of course, varying in proportion in springs of different sizes.

The thus formed blank is then slipped upon the arbor 3 of a grinding machine and which arbor is of approximately the same diameter as the inside of said spring blank. The grinding machine includes a relatively narrow grinding wheel 4 which forms longitudinally extending, arcuately spaced grooves 5 in one end of the springs. Preferably said grooves which are continuous in length, are gradient and begin a suitable distance from the toe end and are deepest at the other end where they open through the extremity of the other end of the spring. The grooved spring blank is then removed from the arbor 3 ready for the next operation.

I then provide a hollow or tubular arbor 6 as best shown in Fig. 4. This arbor, which is suitably heat treated to hold its temper under high temperatures, has an outside diameter slightly greater than the grooved spring blank. The ends of said arbor are beveled as at 7 to permit the easy entrance of the arbor into the spring. Such an arbor which is of a length approximating that of the spring is then pressed into the grooved blank from its grooved end.

As said arbor is of an outside diameter, greater than the inside diameter of the said blank, its insertion or pressing into the blank enlarges the diameter of the blank and causes a relative circumferential movement or slipping between the adjacent coils or convolutions of the blank. In this movement or slipping of the coils, parts of the grooves in alternate coils are circumferentially offset about midway between the parts of the grooves in the intermediate coils. Of course, to obtain this result the number of grooves must be adequate and the diameter of said tubular arbor properly proportioned therefor.

The arbor with the toed and grooved spring blank thus mounted thereon in its expanded condition, is then placed as a unit in a normalizing furnace and subjected to a relatively high temperature for a given length of time and is then quenched. For springs of the 2½" diameter before mentioned, temperatures from 600° to 800° F. provide the desired results in about an hour. As the arbor is tubular, it will heat up quickly. Said arbor is now pressed out of the spring blank which will retain most of its enlargement, resulting from pressing the arbor thereinto and the groove parts will remain staggered or circumferentially offset in the various coils.

The spring is next operated upon externally to fit it with respect to that surface of a clutch with which it is intended to grip. This operation may be either a turning or a grinding one and preferably the latter because of the economy involved and which grinding may be carried out on a centerless grinder.

Heretofore when the grooves were continuous or uninterrupted in length, during the grinding operation, the grinding wheel tended to enter said grooves. This set up a chatter or vibration in the spring so that the ground and finished spring had a contour resembling a many sided polygon with rounded corners and which contour was not best suited for clutching purposes. The spring being inherently flexible, the difficulty in grinding the same is readily apparent. With the spring so made that parts of the grooves in certain of the coils in a group thereof are offset or staggered with respect to groove parts in other coils of said group, the length of said groove parts is so short that there is no tendency for grinding wheel to enter or drop into said groove parts. Thus the spring does not chatter or vibrate and therefore it can be ground to a highly accurate cylindrical surface.

The various operations upon the spring, such as winding up the spring stock into spring blank form, the bending of the end of one convolution to provide the toe or tang, and the grooving set up certain stresses and strains in the metal of the spring. These stresses and strains are such that tend to distort and crystallize the spring when in use, but the normalizing operation before mentioned, relieves these strains and stresses and toughens the spring so that distortion and breakage are avoided.

The method of making the spring has been described as with the spring blank being wound from tempered stock but this is not absolutely necessary. The spring stock may be formed from "soft" untempered stock and then grooved as before described. Thereafter the arbor may be pressed thereinto and the hardening and tempering carried out while so mounted on the arbor. Preferably the arbor is removed from the spring blank before grinding.

By means of the improved method, I am enabled to provide a clutch spring having a very accurate, cylindrical clutching surface which coacts with the surface in the clutch member to be gripped and provides that frictional engagement therewith necessary for the holding power for which it was designed. Such a spring is more uniform in character and therefore has a greater period of usefulness in a clutch.

While in describing the invention, I have referred in detail to the various steps in the method of making the spring, as well as to the sequence of such steps and the structure of the finished spring, the same is to be considered merely as illustrative so that I do not wish to be limited thereto except as may be specifically set forth in the appended claims.

I claim as my invention:

1. The method of making a clutch spring which consists in providing a spring blank having inner and outer annular surfaces, forming a plurality of grooves in one of said surfaces of a group of adjacent coils, operating upon said group of coils to cause relative turning therebetween to offset the grooves in certain of said coils in said group circumferentially with respect to the grooves in other of said coils in said group and then treating one of said surfaces to make it cylindrical and to provide the gripping surface for the finished spring.

2. The method of making a clutch spring which consists in providing a spring blank having inner and outer annular surfaces, forming a plurality of grooves in one of said surfaces of a group of adjacent coils, operating upon said group of coils to cause relative turning therebetween to offset the grooves in certain of said coils in said group circumferentially with respect to the grooves in other of said coils of said group and then treating said surface with the grooves therein to make it cylindrical and provide the gripping surface for the finished spring.

3. The method of making a clutch spring which consists in providing a spring blank having inner and outer annular surfaces, forming a plurality of grooves in one of said surfaces of a group of adjacent coils thereof, operating upon said blank to change its radial dimensions and to offset the grooves in certain of said coils of said group circumferentially with respect to the grooves in other of said coils in said group and then treating one of said surfaces to make it cylindrical and to provide the gripping surface for the finished spring.

4. The method of making a clutch spring which consists in providing a spring blank having inner and outer annular surfaces, forming a plurality of grooves in one of said surfaces of a group of adjacent coils thereof, operating upon said blank to change its radial dimensions and to offset the grooves in certain of said coils in said group circumferentially with respect to the grooves in other of said coils in said group and then treating said surface with the grooves therein to make it cylindrical and provide the gripping surface for the finished spring.

5. The method of making a clutch spring which consists in providing a spring blank, forming a plurality of grooves in the external surface of a group of adjacent coils thereof, radially expanding the spring thus far formed to enlarge its diameter and to offset the grooves in certain of said coils of said group circumferentially with respect to the grooves in other of said coils in said group and then treating said external surface to make it cylindrical and to provide the gripping surface for the finished spring.

6. The method of making a clutch spring which consists in providing a spring blank having inner and outer annular surfaces, forming a plurality of grooves in a group of adjacent coils thereof, operating upon said spring thus far formed to change its radial dimension and to offset the grooves in certain of the coils of said group circumferentially with respect to the grooves in other of said coils in said group, treating said blank to set the same in substantially its changed radial dimensions and then operating upon one of said surfaces to make it cylindrical and to provide the gripping surface for the finished spring.

7. The method of making a clutch spring which consists in providing a spring blank, forming a plurality of grooves in one surface of a group of adjacent coils thereof, applying a member to the spring thus far formed to change its radial dimensions and to offset the grooves in certain of the coils of said group circumferentially with respect to the grooves in the other of said coils in said group, operating upon the spring blank and said member as a unit to set the spring blank in substantially its changed dimensions, separating said blank and member and then operating upon said surface to make it cylindrical and to provide the gripping surface for the finished spring.

8. The method of making a clutch spring which consists in providing a spring blank, forming a plurality of grooves in the external surface of a group of adjacent coils thereof, pressing a member into said spring to radially expand the same and to cause the grooves in certain of the coils of said group to offset circumferentially with respect to the grooves in others of said coils in said group, treating said blank and said member engaged therein, to set the spring blank in its expanded condition, separating the spring and member and then operating upon said surface to make it cylindrical and to provide the gripping surface for the finished spring.

9. The method of making a clutch spring which consists in providing a spring blank, forming a plurality of grooves in one surface of a group of adjacent coils thereof, applying a member to the spring thus far formed to change its radial dimensions and to offset the grooves in certain of the coils of said group circumferentially with respect to the grooves in the other of said coils in said group, operating upon the spring blank and said member as a unit to set the spring blank in substantially its changed dimension, and then operating upon said surface to make it cylindrical and to provide the gripping surface for the finished spring.

10. The method of making a clutch spring which consists in providing a spring blank, forming a plurality of grooves in the external surface of a group of adjacent coils thereof, pressing a member into said spring to radially expand the same and to cause the grooves in certain of the coils of said group to offset circumferentially with respect to the grooves in others of said coils in said group, treating said spring with said member engaged therein as a unit to set the spring blank in its expanded condition and then operating upon said surface to make it cylindrical and to provide the gripping surface for the finished spring.

11. The method of making a clutch spring which consists in providing a spring blank, forming a plurality of grooves in the external surface of a group of adjacent coils at one end of the spring blank, inserting a tubular mandrel into said spring from its grooved end and which mandrel is of a diameter greater than the inside diameter of said coils so as to expand the same and cause relative turning movement between adjacent coils of said group and which offsets the grooves in certain of said coils with respect to the grooves in others of said coils, heat treating said spring blank and tubular mandrel as a unit to set the spring in substantially the expanded condition, removing the mandrel and then operating upon said surface to make it cylindrical and to provide the gripping surface for the finished spring.

CHARLES DREXLER.